Feb. 3, 1959 E. C. WALKER, JR 2,872,225
FLEXIBLE COUPLING FOR SHAFTS
Filed Feb. 13, 1957
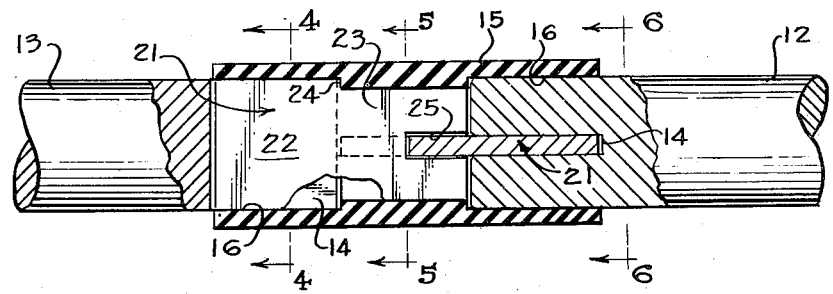
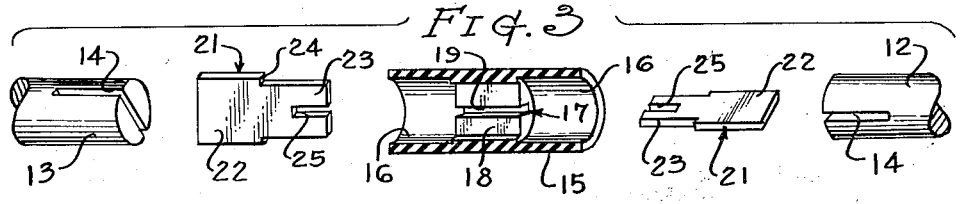
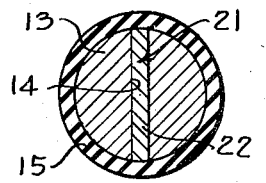 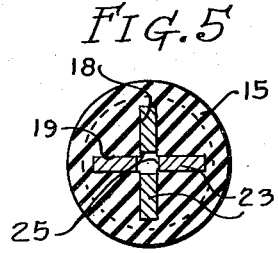 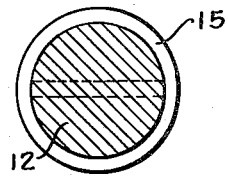
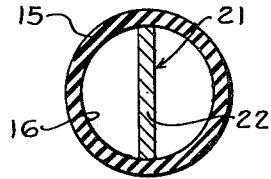 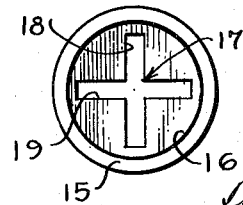
INVENTOR.
Emil C. Walker, Jr.
BY Horton, Davis,
Crewer & Brugman
Attorneys

United States Patent Office 2,872,225
Patented Feb. 3, 1959

2,872,225

FLEXIBLE COUPLING FOR SHAFTS

Emil C. Walker, Jr., Woodstock, Ill., assignor to Comptometer Corporation, a corporation of Illinois Application February 13, 1957, Serial No. 640,040

12 Claims. (Cl. 287—85)

This invention relates in general to couplings, and more particularly to means for coupling a driving shaft to a driven shaft.

Coupling of substantially coaxial shafts for torque transmission, especially in miniaturized precision instrumentation, computer and control devices or applications, involves numerous difficulties and problems not solved by the prior art. For example, such couplings are of substantially greater diameter than the shafts connected thereby, which limits the permissive location of the coupling and affects the design and dimensioning of the other parts of the associated device. They also are relatively expensive, and require very accurate alignment of the shafts and the use of set screws or similar rigid retaining means for securing the same to the shafts.

A principal object of this invention is to provide a simple and inexpensive coupling which also eliminates such objectionable features of the prior art.

Another important object is the provision of a coupling for connecting substantially coaxial shafts which permits of material misalignment of the shafts.

A further important object of the invention is to provide such a coupling which is only slightly greater in diameter than the shafts that it connects so as to enable its use at any desired location without requiring very much clearance between the shafts and adjacent parts.

Another object is to so interconnect substantially coaxial shafts as to automatically compensate for expansions and contractions of the shafts, such as those due to temperature changes.

A further object is to provide a coupling for substantially coaxial shafts which is flexible and minimizes the transmission of shocks and vibrations between the shafts while positively transmitting torque from the driving to the driven shaft in either direction of rotation.

Another object is to eliminate the necessity of using tools and rigid connecting means, such as set screws, for assembling and securing such a coupling to its shafts.

Numerous other objects and advantages of the invention will be apparent as it is better understood from the following description, which, when taken in connection with the accompanying drawings, discloses a preferred embodiment thereof.

In the drawings:

Figure 1 is an elevation of a flexible coupling embodying the features of the present invention mounted to interconnect the adjacent ends of two shafts;

Fig. 2 is a view similar to Fig. 1 on an enlarged scale, with the coupling mechanism shown in longitudinal section;

Fig. 3 is an exploded view of the several parts of the coupling, with the flexible portion thereof in longitudinal section;

Figs. 4, 5, and 6 are detail sectional views taken transversely of the shaft axis substantially on the lines 4—4, 5—5, and 6—6 of Fig. 2;

Fig. 7 is a transverse section similar to Fig. 4 with the shaft removed; and

Fig. 8 is an end elevational view of the central flexible member of the coupling.

Referring more particularly to the drawings, reference numeral 11 indicates in general a flexible coupling incorporating the features of this invention which is shown as interconnecting two shafts 12 and 13, each of which preferably is provided with a longitudinally extending slot 14 in the end thereof to be joined to the other shaft. The coupling 11 includes a flexible member 15 (Figs. 2 and 3) which preferably is cylindrical and formed of suitable neoprene rubber. This flexible member 15 is provided with a longitudinal bore having cylindrical shaft receiving end portions 16 and a central portion 17 of non-circular cross section. Preferably the ends of the flexible member 15 are cored to form the outer portions 16 of the bore which comprise the inner surfaces of flexible rings that are slightly smaller in diameter than the outer diameter of the associated shaft 12 or 13 so as to receive and frictionally embrace the latter. The central portion 17 of the bore of the flexible member 15 extending through the central portion of the latter and communicating with the end portions 16 of the bore preferably is of cruciform shape. As best seen in Figs. 5 and 8, this central bore 17 is comprised of intersecting slots 18 and 19 which extend longitudinally through the central portion of the flexible member 15, as shown in Fig. 3.

Means are provided for separately drivingly interconnecting the shafts 12 and 13 with the flexible member 15 which, in the illustrated embodiment, comprises a pair of rigid blade members, each indicated generally by reference numeral 21. As best seen in Fig. 3, each blade member 21 comprises an outer portion 22 and an inner portion 23 of substantially the same lengths, with the outer portion 22 being somewhat wider to provide shoulders 24 for limiting inward movement of the blade relative to the flexible member 15. When inserted in the central flexible member 15, the rigid blades 21 have their inner portions 23 disposed, respectively, within, and substantially filling, the longitudinal slots or recesses 18 and 19. In order to provide clearance between the otherwise intersecting portions of the two blade members 21 and to prevent physical contact between the blades, each of the inner portions 23 is centrally slotted outwardly from its inner edge at 25, as best shown in Fig. 3. The width and length of these slots 25 is such that the two blade members 21 remain out of contact with each other when fully inserted into the flexible member 15. As illustrated in Fig. 2, the relative dimensioning of these parts and of the central portion of the flexible member 15 is such that with the shoulders 24 of the blade members abutting against the outer transverse surfaces of the central portion of the flexible member 15, the inner ends of the slots 25 are in spaced relationship to each other and the inner ends of the inner portions 23 are disposed inwardly of the central portion of the flexible member 15 and spaced inwardly from the adjacent end surface thereof which are contacted by the shoulder 24 of the other blade member 21. And as shown in Fig. 5, the slots 25 are of sufficient width to avoid contact between the edges of each of them and the outer part of the inner portion 23 of the other blade member 21.

In addition to the frictional engagement between the flexible member 15 and the adjacent ends of the shafts 12 and 13 when the coupling is mounted as shown in Figs. 1 and 2, means are provided for connecting each rigid blade member 21 to a said shaft for transmitting torque between the latter and the central portion of the flexible member 15. This means comprises the longitudinally extending slot 14 in the adjacent end of each of the shafts 12 and 13 for slidingly receiving the outer portion 22 of the associated blade member 21. In the assembled relationship shown in Figs. 1, 2, 4, and 5, it thus will be seen that rotation of either shaft 12 or 13 in either direction will be transmitted to the other shaft through the intermediate flexible member 15. Such torque as may be applied to a rigid blade 21 by its associated shaft is transmitted by the inner portion 23 thereof against the opposite walls or side surfaces of the oppositely extending arms 18 or 19 of the central cruciform bore 17. Such torque then is transmitted to the corresponding legs of the inner portion 23 of the other rigid blade member 21 through the quadrant or segmental portion of the central part of the flexible member 15 (Fig. 5) disposed between adjacent portions of the respective driving and driven blade members 21. Thus torque from either shaft 12 or 13 will be drivingly transmitted to the other said shaft in either direction by the rigid members 21 through the flexible member 15.

Since direct contact between the blade members 21 is prevented, as above described, the transmission of mechanical vibrations from the driving shaft to the driven shaft is substantially eliminated and this flexible coupling will silently absorb any impact forces, such as those associated with torque fluctuations. The construction and arrangement of the parts above described minimizes the space requirements of this coupling and eliminates the necessity of employing any set screws or other rigid means for securing the same to the shafts interconnected thereby. It also will be appreciated that this novel flexible coupling accurately compensates for misalignment of the shafts 12 and 13 and does not require that the coupled shafts be disposed in accurate coaxial relationship. When one shaft is slightly offset or angularly disposed relative to the other, the coupling 11 functions in the manner of a universal joint, and rotation of the driving shaft will be accurately transmitted to the driven shaft by virtue of the elastic character of the flexible member 15. It will also be apparent that this novel coupling automatically compensates for expansions and contractions of the shafts 12 and 13 to avoid any possibility of such dimensional variations in the shafts effecting any inaccuracies in the transmission of torque therebetween. While the illustrated embodiment is dimensioned for interconnecting two shafts of the same diameter, it will readily be appreciated that the same may be differently dimensioned at opposite ends to accommodate and connect in similar manner two shafts having different diameters. And, while the present form is shown as embodying a central bore in the flexible member defining a right-angled cross in any section normal to thet shaft axis, it will be understood that such shape is susceptible of wide variation, such as an oblique cross. However, in order to facilitate assembly and disassembly, it is preferred that the torque transmitting surfaces of the coupling be disposed substantially parallel to the longitudinal axis thereof.

It is thought that the invention and many of its attendant advantages will be understood from the foregoing description, and it will be apparent that various changes may be made in the form, construction, and arrangement of the parts without departing from the spirit and scope of the invention or sacrificing all of its material advantages, the form hereinbefore described being merely a preferred embodiment thereof.

I claim:

1. Coupling means for joining two substantially coaxial shafts, comprising an outer member having a bore with end portions for receiving the adjacent ends of said shafts, said bore having a central portion of non-circular cross section, and means separately interconnecting each said shaft and said central portion of said outer member for drivingly transmitting torque from one of said shafts to the other through the agency of said outer member.

2. Coupling means for joining two substantially coaxial shafts, comprising a flexible outer member having a bore with end portions for receiving the adjacent ends of said shafts, said bore having a central portion of non-circular cross section, and a rigid member separately connecting each said shaft and said central portion of said flexible member for drivingly transmitting torque from one of said shafts to the other through said flexible member.

3. Coupling means according to claim 2, wherein said end portions of said bore are slightly smaller than the ends of said shafts received therein, whereby said flexible member frictionally grips said shafts.

4. Coupling means for interconnecting the adjacent ends of two shafts, comprising a flexible member having end recesses each for receiving an end of a said shaft and a central portion having a slot communicating with each said recess, and a rigid member disposed in each said slot and connected to a said shaft for transmitting torque between the latter and said central portion of said flexible member.

5. Coupling means for joining two substantially coaxial shafts, comprising a flexible member adapted to be disposed between adjacent ends of said shafts and having slots therein defining surfaces substantially parallel to the axis of said shafts, and rigid means disposed in each said slot in contact with a said surface and connected to a said shaft for transmitting torque between the latter and said flexible member.

6. Coupling means according to claim 5, wherein said slots are angularly disposed with respect to each other.

7. Coupling means according to claim 5, wherein said slots intersect each other to define a cross in any section normal to the axis of said shafts.

8. Coupling means for interconnecting two shafts, comprising a flexible member adapted to be disposed between adjacent ends of said shafts and having a cruciform bore, and a rigid blade member connected for rotation with each said shaft and extending into said bore.

9. Coupling means according to claim 8, wherein the inner end portion of each said blade substantially fills the oppositely extending arms of said bore and is centrally slotted to provide clearance with the other said blade.

10. Coupling means according to claim 8, wherein said flexible member includes end rings formed integrally therewith for frictionally embracing said adjacent ends of said shafts.

11. Coupling means according to claim 10, wherein said adjacent ends of said shafts are slotted to receive said blade members.

12. Coupling means for interconnecting the adjacent ends of two shafts having longitudinally extending slots, comprising a cylindrical flexible member having cored ends for frictionally embracing said adjacent ends of said shafts and a central portion having a cruciform bore defined by intersecting longitudinal slots, a rigid blade having an outer portion disposed in said slot of a said shaft and an inner portion disposed in a said slot of said flexible member, and a similar rigid blade having an outer portion disposed in said slot of the other said shaft and an inner portion disposed in the other said slot of said flexible member, said inner portions of said blades being centrally longitudinally slotted to provide clearance therebetween, whereby torque from either said shaft will be drivingly transmitted to the other said shaft in either direction through said flexible member.

References Cited in the file of this patent

UNITED STATES PATENTS

| | | |
|---|---|---|
| 1,532,464 | Woodward | Apr. 7, 1925 |
| 1,702,057 | Murray | Feb. 12, 1929 |
| 1,772,495 | Powell | Aug. 12, 1930 |
| 2,079,460 | Marty | May 4, 1937 |
| 2,171,999 | Weiland | Sept. 5, 1939 |
| 2,433,948 | Good | Jan. 6, 1948 |

FOREIGN PATENTS

| | | |
|---|---|---|
| 434,709 | Great Britain | Sept. 6, 1935 |
| 750,963 | France | June 12, 1933 |
| 808,017 | Germany | July 9, 1951 |